United States Patent
Kezuka

(10) Patent No.: US 6,547,969 B1
(45) Date of Patent: Apr. 15, 2003

(54) PROCESS FOR TREATING FLUORINE-CONTAINING WASTE SOLUTION

(75) Inventor: Satoshi Kezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/513,311

(22) Filed: Feb. 25, 2000

(30) Foreign Application Priority Data

Mar. 18, 1999 (JP) .......................................... 11-074416

(51) Int. Cl.⁷ ................................................. C02F 1/58
(52) U.S. Cl. ...................... 210/638; 210/639; 210/713; 210/724; 210/915
(58) Field of Search ................................ 210/638, 639, 210/651, 713, 724, 726, 915

(56) References Cited

U.S. PATENT DOCUMENTS

| | | | | |
|---|---|---|---|---|
| 4,014,787 A | * | 3/1977 | Shorr ......................... | 210/651 |
| 4,670,150 A | * | 6/1987 | Hsiung et al. .............. | 210/636 |
| 5,043,072 A | * | 8/1991 | Hitotsuyanagi et al. ..... | 210/638 |
| 5,501,798 A | * | 3/1996 | Al-Samadi et al. ......... | 210/652 |
| 5,824,227 A | * | 10/1998 | Cargnel et al. ............. | 210/713 |
| 5,910,251 A | * | 6/1999 | Allen et al. ................. | 210/638 |
| 6,331,258 B1 | * | 12/2001 | Kezuka et al. ............. | 210/712 |

FOREIGN PATENT DOCUMENTS

| | | |
|---|---|---|
| JP | 60-241988 | 11/1985 |
| JP | 9-85262 | 3/1997 |
| JP | 10-94787 | 4/1998 |
| JP | 10-128344 | 5/1998 |
| JP | 10-314797 | 12/1998 |
| JP | 2000-5770 | 1/2000 |
| JP | 2000-15269 | 1/2000 |

* cited by examiner

Primary Examiner—Peter A. Hruskoci
(74) Attorney, Agent, or Firm—Armstrong, Westerman & Hattori, LLP

(57) ABSTRACT

A process and apparatus for treating a fluorine-containing waste solution that is able to maintain a high treatment volume while also facilitating easy maintenance. A calcium salt such as calcium hydroxide and an inorganic coagulant are added with timing to the fluorine-containing waste solution, followed by filtration of said waste solution by cross-flow filtration.

5 Claims, 2 Drawing Sheets

PROCESS FOR TREATING FLUORINE-CONTAINING WASTE SOLUTION

BACKGROUND OF THE INVENTION

1. Field to the Invention

The present invention relates to a process and apparatus for treating fluorine-containing waste solution discharged from semiconductor plants and so forth. More particularly, the present invention relates to a waste solution treatment process and apparatus that uses a solid-liquid separation filtration membrane.

2. Description of the Prior Art

Hitherto, a process for removing fluorine from a waste solution containing hydrogen fluoride, ammonium fluoride or other fluorine compounds discharged from semiconductor plants and so forth has been carried out by adding calcium hydroxide i.e. slaked line, to the waste solution, forming insoluble calcium fluoride and then separating the solid and liquid by a filtration membrane and sedimentation. In the case of a waste solution treatment process using a solid-liquid separation filtration membrane, it was typical to employ a system that an entire volume of waste solution, is filtered.

However, in the above-mentioned prior art process, due to the susceptibility to the occurrence of decreased flux caused by clogging of the filtration membrane, it was difficult to maintain a high volume of treated solution.and the process required considerable labor for maintenance.

SUMMARY OF THE INVENTION

Accordingly, one object of the present invention is to provide a waste solution treatment process that is able to maintain a high volume of treated solution while also allowing easy maintenance.

Another object of the present invention is to provide an apparatus for carrying out the treatment process of the present invention.

The above-mentioned objects can be accomplished by adding calcium salt and an inorganic coagulant to a fluorine-containing waste solution, followed by filtering said waste solution by cross-flow filtration.

Also, after insolubilizing the fluorine in said waste solution by adding calcium salt, it is more preferable to coagulate the insolubilized fluorine by addition of an inorganic coagulant.

Further, it is preferable to use iron salt and/or aluminum salt as the inorganic coagulant, more preferably iron salt.

In addition, according to the present invention, there is provided an apparatus for treating a fluorine-containing waste solution which comprises a calcium salt feed unit that supplies calcium salt to fluorine-containing waste solution, an inorganic coagulant feed unit that supplies an inorganic coagulant to said waste solution, and a filtration unit that filters said waste solution, to which calcium salt and an inorganic coagulant have been added, with timing, by cross-flow filtration.

The apparatus may be preferably configured so that calcium salt and inorganic coagulant are supplied to a common coagulation tank to which said waste solution is supplied.

Alternatively, the apparatus may be preferably configured to have a pre-stage reaction tank and post-stage coagulation tank, in which fluorine-containing waste solution is supplied, so that the calcium salt feed unit supplies calcium salt to the reaction tank, while the inorganic coagulant feed unit supplies inorganic coagulant to the coagulation tank.

DESCRIPTION OF THE PREFERRED EMBODIMENTS

Figure 1:
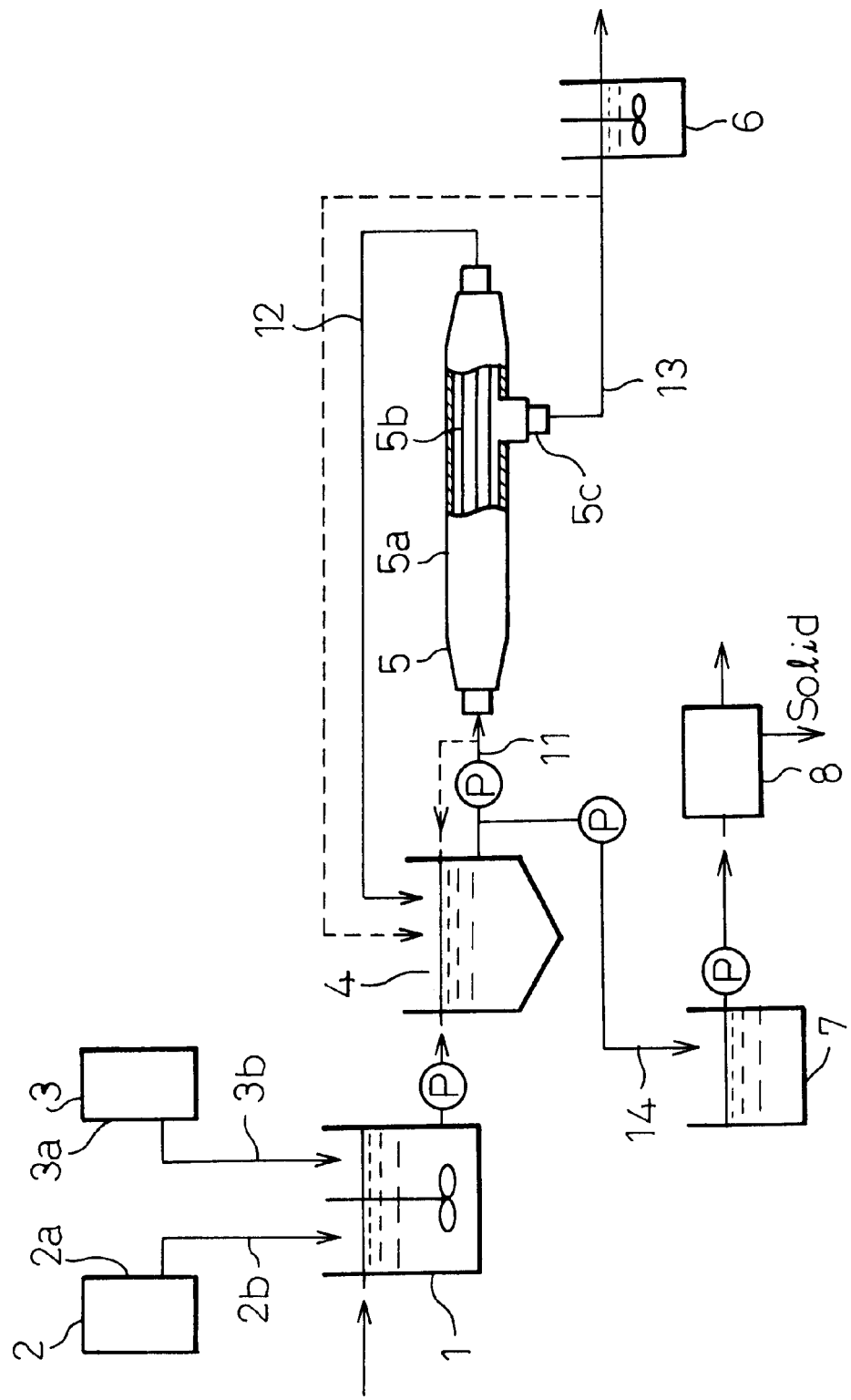
FIG. 1 is a flow sheet showing one preferred embodiment of a treatment system for fluorine-containing waste solution according to the present invention.

FIG. 1 is a flow sheet showing one preferred embodiment of the treatment system for fluorine-containing waste solution of the present invention. The treatment system shown here is composed of coagulation tank 1, which coagulates fluorine in fluorine-containing waste solution, calcium hydroxide feed unit 2, which supplies calcium salt in the form of calcium hydroxide to coagulation tank 1, inorganic coagulant feed unit 3, which supplies inorganic coagulant to coagulant tank 1, circulation tank 4, into which waste solution is fed after passing through coagulation tank 1, filtration unit having filtration membrane 5b that separates and removes coagulated product in circulation tank 4, permeating solution storage tank 6 that holds permeating solution obtained from filtration unit 5, concentrate storage tank 7 that holds concentrate, and dehydrator 8 that dehydrates the coagulated product in the concentrate.

The calcium hydroxide feed unit 2 is equipped with storage tank 2a that holds calcium hydroxide, and pipe or conduit 2b that guides calcium hydroxide supplied from storage tank 2a into coagulation tank 1.

The inorganic coagulant feed unit 3 is equipped with storage tank 3a that holds inorganic coagulant, and pipe 3b that guides inorganic coagulant supplied from storage tank 3a into coagulation tank 1.

A filtration unit having a structure in which one or a plurality of cylindrical filtration membranes 5b are housed in outer casing 5a can be used as filtration unit 5.

An outer casing made of synthetic resin, etc. and having an outer diameter of, for example, 30–150 mm can be used for outer casing 5a.

Efflux hole 5c, which leads permeating solution, that has permeated filtration membrane 5b from the inside to the outside to the outside of the outer casing, is formed in outer casing 5a.

A filtration membrane comprised of fibers such as polyester, Nylon, polypropylene, cotton, glass carbon, glass fiber, carbon fiber, stainless steel, PTFE or PVDF and so forth formed into the form of a fabric having a thickness of roughly 0.2–2 mm by weaving, knitting, adhesion or stitch bonding, and, for example, formed into a cylindrical shape having an outer diameter of 10–30 mm can be used for filtration membrane 5b.

It is preferable to set the flow rate (mean value) of waste solution that flows through filtration membrane 5b to be 1–2 m/s corresponding to the treated waste solution volume during the filtration operation which will be described later.

Both ends of filtration membrane 5b are fixed to be liquid-tight to both ends of outer casing 5a while leaving both ends of filtration membrane 5b open. Waste solution introduced into filtration unit 5 flows through filtration membrane 5b from one end and flows out through the other end. At this time, permeating solution that permeates filtration membrane 5b from the inside to the outside is led to the outside through efferent hole 5c in outer casing 5a.

In addition, a filter press, a belt press or a screw decanter, and so forth may be used as dehydrator 8.

Next, the following provides an explanation of an embodiment of the treatment process for fluorine-containing waste solution of the present invention as an example of the case of using the above-mentioned system.

Examples of fluorine-containing waste solution serving as the target of the treatment process of the present invention include waste solution discharged from an etching process or cleaning process during semiconductor production process. These etching and cleaning waste solutions normally contain fluorine at the level of 10,000–20,000 mg/l and 50–2,000 mg/l, respectively.

In the treatment process of the present embodiment, together with introducing fluorine-containing waste solution into coagulation tank 1, calcium hydroxide and an inorganic coagulant are supplied to coagulation tank 1 using calcium hydroxide feed unit 2 and inorganic coagulant feed unit 3, followed by adequately stirring the waste solution in coagulation tank 1.

Calcium hydroxide can be added to coagulation tank 1 in the form of a powder or suspension. Although the amount of calcium hydroxide added is set according to the amount of fluorine contained in the waste solution, it is preferably, for example, 98–50,000 mg/liter.

In addition, an inorganic coagulant can be added to coagulation tank 1 in the form of an aqueous solution or powder. Although the amount of inorganic coagulant added is set according to the amount of fluorine contained in the waste solution and the suspended state, it is preferably, for example, 2–800 mg/liter.

Iron salt or aluminum salt can be used for the inorganic coagulant. The use of iron salt in particular is preferable since the coagulated product can be made coarser and its liquid filtering power can be enhanced. Examples of iron salts that can be used include ferrous sulfate, ferric sulfate, ferric chloride, chlorinated copperas, and $[Fe_2(OH)_n(SO_4)_{3-n/2}]_m$ wherein m and n each is a positive integer. The use of $[Fe_2(OH)_n(SO_4)_{3-n/2}]_m$ in particular is preferable because of its effect of enhancing the liquid filtering power of the coagulated product. Examples of aluminum salts that can be used include aluminum sulfate, sodium aluminate and aluminum polychloride.

In addition, the pH in coagulation tank 1 is preferably adjusted to 7–10 by suitably adjusting the amount of the above-mentioned calcium hydroxide added or by separately adding a pH adjusting agent.

Furthermore, if both calcium hydroxide and an inorganic coagulant are charged simultaneously during their addition, since the reaction between calcium hydroxide and inorganic coagulant ends up taking place prior to the reaction with fluorine in the waste solution, it is preferable to add inorganic coagulant after allowing the formation of microparticles containing calcium fluoride by addition of calcium hydroxide. More specifically, it is appropriate to make the timing at which calcium hydroxide is supplied by calcium hydroxide feed unit 2 different from the timing at which inorganic coagulant is supplied by inorganic coagulant feed unit 3.

As a result of adding the above-mentioned calcium hydroxide, the fluorine in the waste solution becomes calcium fluoride and is insolubilized, and microparticles containing calcium fluoride as their main ingredient are formed. The majority of the microparticles are coagulated by inorganic coagulant and thus a coarse coagulated product is produced.

Next, waste solution containing the resulting coagulated product is introduced into circulation tank 4, and waste solution inside circulation tank 4 is introduced into filtration unit 5. Waste solution that has entered filtration unit 5 flows into filtration membrane 5b from one end, flows through filtration membrane 5b, flows out from the other end, and returns to circulation tank 4 through pipe 12 followed by additionally circulating through pipe 11, filtration unit 5, pipe 12 and circulation tank 4.

In this circulation process, a portion of the waste solution that has flowed into filtration membrane 5b permeate's filtration membrane 5b while flowing along filtration membrane 5b, and flows out to the outside of filtration membrane 5b in the form of permeating solution. The method of performing filtration while allowing treated solution to flow along a filtration membrane in this manner is referred to as the cross-flow method.

When waste solution permeates filtration membrane 5b, the above-mentioned coagulated product contained in the waste solution accumulates on filtration membrane 5b resulting in the formation of a sediment layer composed of the above-mentioned coagulated product. When this sediment layer is formed, coagulated product contained in waste solution that permeates filtration membrane 5b is trapped by this sediment layer resulting in the permeating solution becoming clear. Permeating solution that appears on the outside of filtration membrane 5b is led to the outside of outer casing 5a through efferent hole 5c, is introduced into permeating solution storage tank 6 through pipe 13 where it is discharged outside the system in the form of treated solution, following adjustment of the pH as necessary.

When waste solution flows through filtration membrane 5b, in contrast to coagulated product having a large diameter accumulating more easily on filtration membrane 5b, since the weight of small diameter coagulated product per unit surface area is small, small diameter coagulated product flows more easily in the circulating waste solution and passes more easily through filtration unit 5 with that waste solution.

As a result of a portion of the small diameter coagulated product, contained in circulating waste solution and that has passed through filtration unit 5, adhering to itself during the course of circulating through circulation tank 4, pipe 11, filtration unit 5 and pipe 12, it forms large diameter particles that accumulate on filtration membrane 5b.

In this manner, in the present invention, as a result of employing cross-flow filtration in which treated waste solution containing coagulated product that has become increasingly coarse due to addition of inorganic coagulant is filtered while flowing along a filtration membrane; large diameter particles are selectively accumulated on filtration membrane 5b. Consequently, it is difficult for clogging of filtration membrane 5b to occur, and a high flux is maintained.

Thus, it becomes possible to lower the frequency of filtration membrane cleaning which, together with making maintenance easier, makes it possible to increase the treated solution volume by as much as, for example, 5 to 10-fold.

In addition, since treatment can be performed with a filtration membrane having a small surface area, the equipment cost required for filtration unit 5 can be reduced.

Furthermore, although there are examples of loading a calcium salt and a coagulant during treatment of fluorine-containing waste solution even in the prior art, there are no examples of filtering the waste solution, after the loading, by cross-flow filtration. In addition, the coagulant in this case is used as an electrical neutralizer of the particles, and its application differs from that of the present invention. Namely, in the present invention, since fluorine is coagulated using a coagulant prior to cross-flow filtration as described above, it is possible to obtain a large treated water volume in comparison with the prior art.

When a portion of the waste solution is discharged as permeating liquid, the concentration of the above-mentioned coagulated product in the circulating waste solution increases. When this concentration of coagulated product reaches a predetermined value, a portion of the circulating waste solution is led out of circulation tank 4, as concentrate, through pipe 14 and is introduced into dehydrator 8 after passing through concentrate storage tank 7. Coagulated product in the above-mentioned concentrate is discharged outside the system after dehydration by dehydrator 8.

When a sediment layer having a thickness above a predetermined thickness is formed on filtration membrane 5b due to a long period of filtration, it is preferable to pass cleaning water from the permeating side (outside) to the concentrating side (inside) of filtration membrane 5b by a feed pump not shown to backwash the filtration membrane 5b. At this time, although backwash water is introduced into dehydrator 8 to allow the solid portion to be dehydrated, if the SS (suspended solid) concentration at this time is too low, it is preferable to return it to a prior stage (not shown) of coagulation tank 1.

Figure 2:
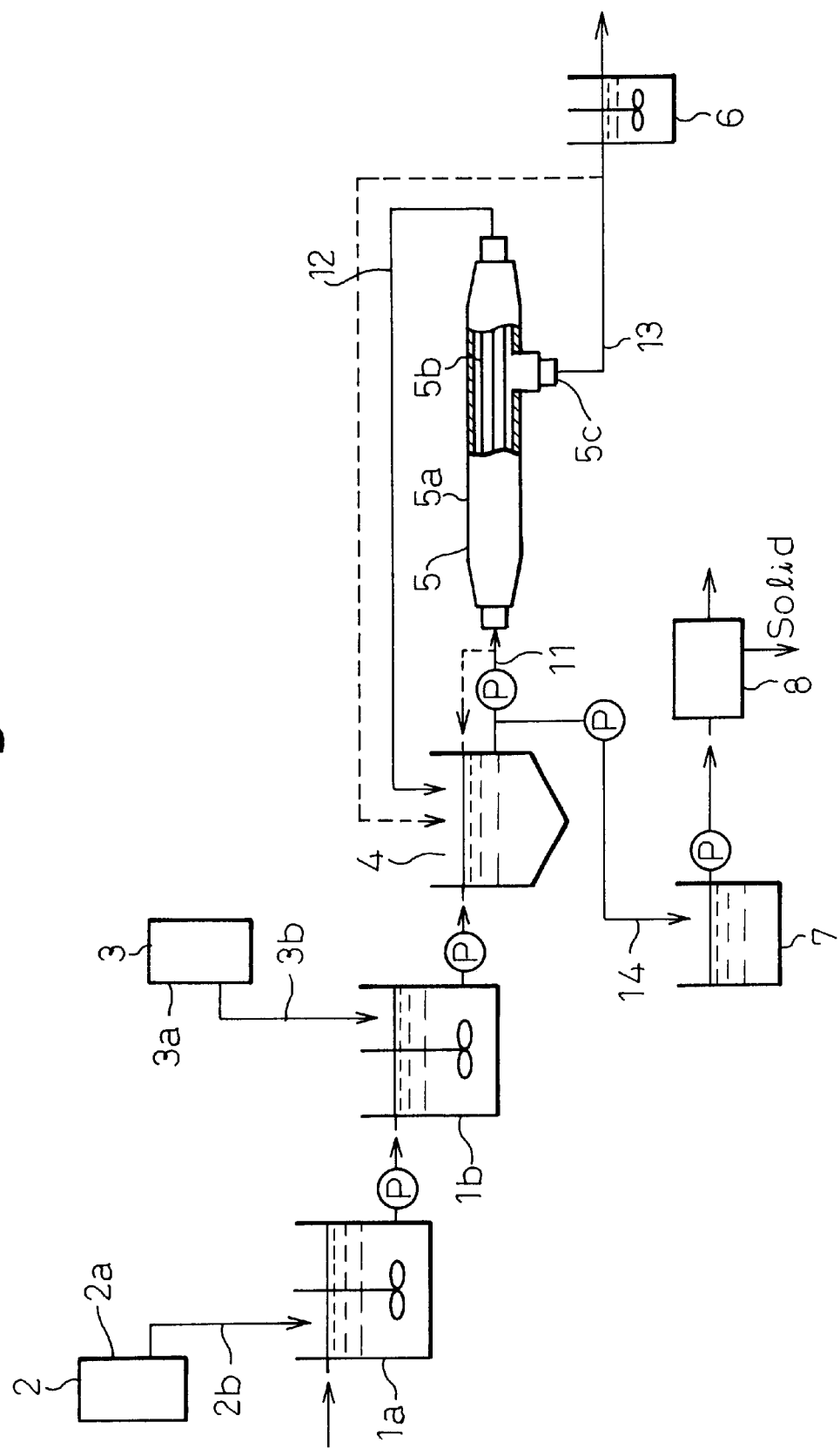
FIG. 2 is a flow sheet showing another preferred embodiment of a treatment system for fluorine-containing waste solution according to the present invention.

In addition, the treatment system shown in FIG. 2 can also be used in the practice of the present invention. In the treatment system shown, coagulation tank 1 is not provided, and instead of coagulation tank 1, the system is equipped with calcium hydroxide reaction tank 1a, in which calcium hydroxide supplied from calcium hydroxide feed unit 2 is added to a fluorine-containing waste solution contained therein to insolubilize the fluorine present in the fluorine-containing waste solution, and an inorganic coagulant agglutination tank 1b, in which an inorganic coagulant is added to fluorine-containing waste solution supplied from reaction tank 1a to coagulates the insoluble product thereof. That is, the treatment system differs from the treatment system shown in FIG. 1 with respect to this point.

In order to perform treatment of fluorine-containing waste solution using this treatment system, in addition to introducing fluorine-containing waste solution into calcium hydroxide reaction tank 1a, calcium hydroxide is supplied to reaction tank 1a using calcium hydroxide feed unit 2 to insolubilize the fluorine in the waste solution, as calcium fluoride, followed by the formation of microparticles having calcium fluoride as their main ingredient.

Next, in addition to a solution containing these microparticles being supplied to inorganic coagulant coagulation tank 1b, an inorganic coagulant is supplied to coagulation tank 1b using inorganic coagulant feed unit 3 to coagulate the majority of the microparticles in coagulation tank 1b.

In the present embodiment, it is necessary to consider the timing at which calcium hydroxide and an inorganic coagulant are supplied since calcium hydroxide reaction tank 1a and an inorganic coagulant coagulation tank 1b are separate. This is because calcium hydroxide and an inorganic coagulant are inevitably added in sequence in order to sequentially pass through the above-mentioned calcium hydroxide reaction tank 1a and an inorganic coagulant coagulation tank 1b.

Furthermore, although the above-mentioned explanation pertains to the example of a case of using calcium hydroxide ($Ca(OH)_2$) as calcium salt, in the present invention, calcium carbonate ($CaCO_3$) or calcium chloride ($CaCl_2$) can also be used as calcium salt.

EXAMPLES

The present invention will be further described with reference to the following examples. Note, however, that the present invention should not be restricted to these examples.

Example 1

Fluorine-containing waste solution originating from a semiconductor plant was treated, as indicated below, using the treatment system shown in FIG. 1. Concentrated fluorine-containing waste solution containing 20,000 mg/liter of fluorine and having a pH of 1 was used as the fluorine-containing waste solution.

Tanks having a capacity of 245 liters and 65 liters were used as coagulation tank 1 and circulation tank 4, respectively.

In addition, a membrane module (Product of EPOC; Model HS3-3) was used as filtration unit 5. This membrane module consisted of three cylindrical filtration membranes 5b contained in a cylindrical outer casing 5a (inner diameter: 40 cm, length: 120 cm) along the outer casing 5a. In this membrane module, filtration membrane 5b is composed of woven polyester fabric (thickness: 0.5 mm), and was formed into a cylindrical shape having an inner diameter of 12 mm.

While introducing the above-mentioned waste solution into coagulation tank 1 at a flow rate of 0.26 m$^3$/h, in addition to adding calcium hydroxide to the waste solution in coagulation tank 1 so that the amount added relative to the waste solution was 40,000 mg/liter, an iron-based coagulant $[Fe_2(OH)_n(SO_4)_{3-n/2}]_m$ was added to coagulation tank 1 so that the amount added relative to the waste solution was the value shown in Table 1 and the solution was then mixed well.

Waste solution in coagulation tank 1 was introduced into filtration unit 5 after passing through circulation tank 4. The flow rate (mean value) of waste solution flowing into filtration membrane 5b relative to filtration membrane 5b was 1.5 m/s. In addition, the pressure of waste solution at the entrance to filtration unit 5 was set to 2 kg/cm$^2$.

The above-mentioned filtration operation was performed for 160 hours, and the flux in filtration unit 5 during this operation was measured. The flux values at the start and end of the test are shown in Table 1.

Example 2

Using a dilute fluorine-containing waste solution originating from a semiconductor plant and having a fluorine content of 50 mg/liter and pH of 3 as the fluorine-containing waste solution, in addition to adding calcium hydroxide so that the amount added relative to the waste solution was 1,200 mg/liter, a treatment test was performed using the amount shown in Table 1 as the amount of $[Fe_2(OH)_n(SO_4)_{3-n/2}]_m$ added. Moreover, in this example, after supplying calcium hydroxide, hydrochloric acid (HCl) was added as an agent to adjust pH, prior to adding $[Fe_2(OH)_n(SO_4)_{3-n/2}]_m$.

The above-mentioned filtration operation was performed for 260 hours, and the flux in filtration unit 5 during this operation was measured. The flux values at the start and end of the test are shown in Table 1.

Comparative Examples 1 and 2

For the comparison purpose, the treatment of fluorine-containing waste solution of Examples 1 and 2 was performed by cross-flow filtration without adding $[Fe_2(OH)_n(SO_4)_{3-n/2}]_m$. The flux values are shown in Table 1. In the comparative examples, the treatment tests were conducted in the same manner as Examples 1 and 2, respectively, with the exception of not adding $[Fe_2(OH)_n(SO_4)_{3-n/2}]_m$. Note that the added amounts of calcium hydroxide and inorganic coagulant were calculated on the basis of their solid components.

In addition, in the above-mentioned examples and comparative examples, the waste solution to be treated was circulated through pipe 11, filtration unit 5, pipe 12 and circulation tank 4 to form a sediment layer composed of coagulated product on filtration membrane 5b, during a short time which until the filtration operation was started after adding inorganic coagulant.

In all of the examples and comparative examples, the fluorine concentration in the permeating solution was 10 mg/liter or less, and the SS concentration was 2 mg/liter or less. This means that the treated solution has a satisfactory quality.

TABLE 1

| | Inorganic Coagulant | | Flux | |
|---|---|---|---|---|
| | Type | Amt. Added (mg/liter) | Start of Test (L/m² · H) | End of Test (L/m² · H) |
| Example 1 | $[Fe_2(OH)_n(SO_4)_{3-n/2}]_m$ | 150 | 180 | 77 |
| Comp. Ex. 1 | None | 0 | 33 | 10 |
| Example 2 | $[Fe_2(OH)_n(SO_4)_{3-n/2}]_m$ | 500 | 1935 | 1786 |
| Comp. Ex. 2 | None | 0 | 893 | 869 |

It is appreciated from Table 1 that a decrease in flux occurred due to clogging of the filtration membrane immediately after the start of the test in Comparative Examples 1 and 2, and flux remained at a low level until the end of the test. In contrast, in Examples 1 and 2 in which inorganic coagulant was added, the flux was maintained at a high level.

Furthermore, since the membrane module used in these examples assumes treatment of waste solution having a moderate fluorine concentration on the order of 200–300 mg/liter, in the case of a normal mode of use not accompanied by addition of inorganic coagulant, a sufficient treatment flow rate was not obtained in Comparative Example 1 in which the concentration was far above the assumed concentration, and in Comparative Example 2 in which the concentration was conversely lower than the assumed concentration. In Examples 1 and 2, however, since the fluorine-coagulated product is made coarser by addition of $[Fe_2(OH)_n(SO_4)_{3-n/2}]_m$, a sufficiently practical treatment flow volume was obtained with respect to both concentrated and dilute fluorine-containing waste solution.

As has been explained above, according to the present invention, a high level of flux can be maintained while preventing clogging of the filtration membrane. Thus, according to the present invention, in addition to facilitating easy maintenance, the treated solution volume can be maintained at a high level.

What is claimed is:

1. A process for treating a fluorine-containing waste solution discharged during semiconductor process which treating process comprises adding calcium salt to said waste solution to form microparticles containing calcium fluoride, adding an inorganic coagulant to said waste solution containing the microparticles to form a coarse coagulated calcium fluoide, adjusting the pH of the waste solution to 7 to 10, wherein said inorganic salt is an iron salt selected from the group consisting of ferrous sulfate, ferric sulfate, ferric chloride, chlorinated copperas, and $[Fe_2(OH)_n(SO_4)_{3-n/2}]_m$, wherein m and n each is a positive integer followed by filtration of said waste solution by cross-flow filtration so that said product is selectively accumulated on a filter membrane.

2. A process as set forth in claim 1 wherein said calcium salt is calcium hydroxide, and is added in a rate of 98–50,000 mg/liter of said waste solution.

3. A process as set forth in claim 1 wherein said iron salt is added in a rate of 2–800 mg/liter of said waste solution.

4. A process as set forth in anyone of claims 2, or 3 wherein said cross-flow filtration is carried out by flowing said waste solution along a filtration membrane made of woven, knitted, adhered or stitch bonded fabric of fibers.

5. A process as set forth in claim 4 wherein said waste solution is flowed through said filtration membrane at a flow rate of 1–2 m/s.

* * * * *